(No Model.)
J. W. MILAM.
CORK EXTRACTOR.
No. 390,691. Patented Oct. 9, 1888.
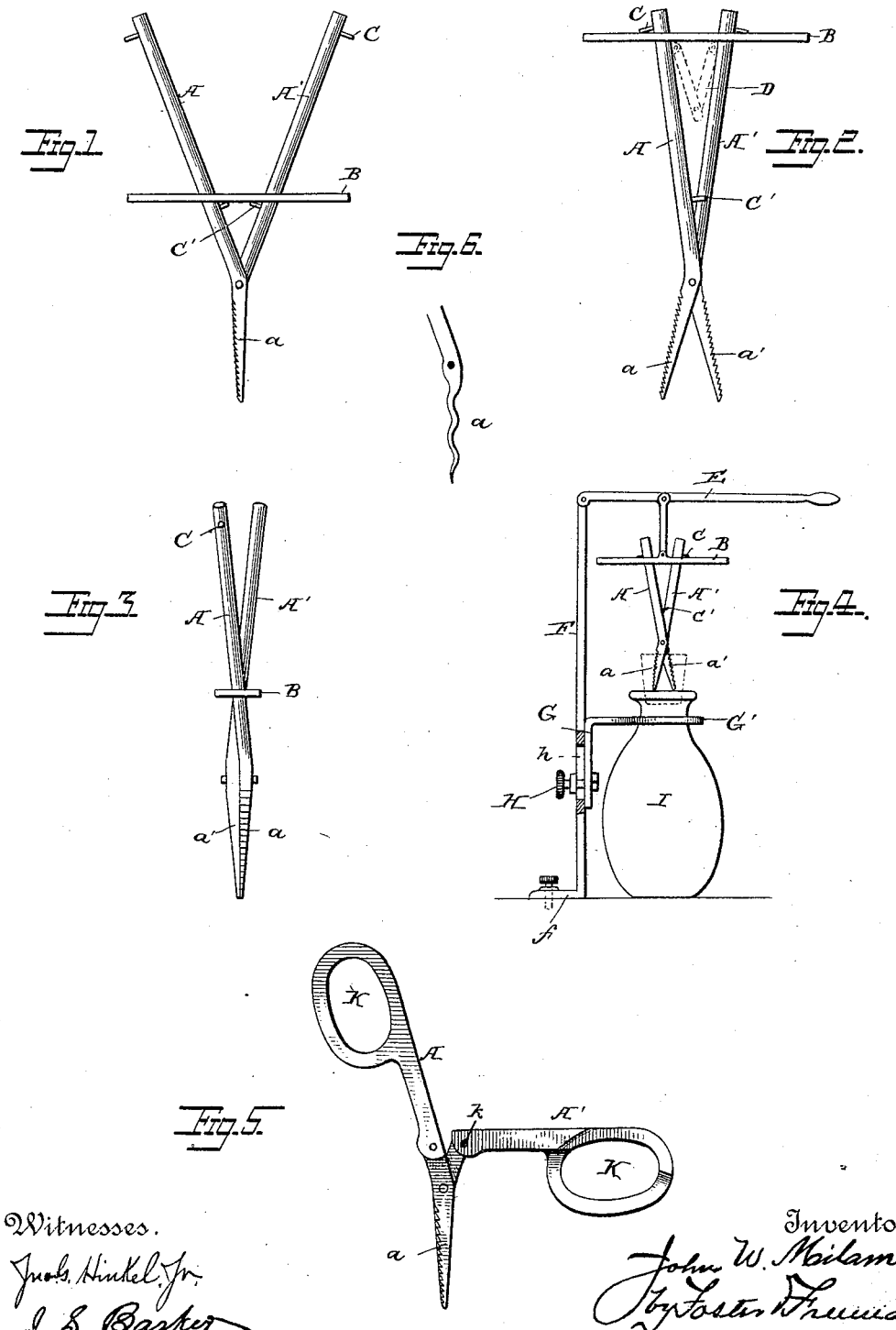
Witnesses.
Jno. S. Hinkel, Jr.
J. S. Barker
Inventor,
John W. Milam
by Foster Freeman
Attorney

UNITED STATES PATENT OFFICE.

JOHN W. MILAM, OF FRANKFORT, KENTUCKY.

CORK-EXTRACTOR.

SPECIFICATION forming part of Letters Patent No. 390,691, dated October 9, 1888.

Application filed December 19, 1887. Serial No. 258,319. (No model.)

*To all whom it may concern:*

Be it known that I, JOHN W. MILAM, a citizen of the United States, residing in Frankfort, Franklin county, Kentucky, have invented certain new and useful Improvements in Cork-Extractors, of which the following is a specification.

This invention relates to a device for extracting corks from the necks of bottles; and it consists of pivoted levers having piercing prongs or fingers adapted when lying side by side, to be driven into the cork, where they may be separated and forced into engagement therewith, after which they, with the cork, may be withdrawn, the implement being constructed and operated as hereinafter described, and as shown in the drawings, wherein—

Figures 1 and 2 are side views of the implement in different positions. Fig. 3 is an edge view of Fig. 1. Fig. 4 is a perspective view of the extractor combined with an operating-lever and supporting-stand. Fig. 5 shows a style of the invention of convenient form to be carried in the pocket. Fig. 6 illustrates a modified form of one of the prongs.

The implement consists of two bent bars or levers, A A', pivoted together at their bends, the long arms constituting handles and the short prongs or arms being capable of being brought to coincide and form a piercer. Each prong $a$ tapers both longitudinally and transversely to a rather sharp point at the end, and the prongs when closed together, as shown in Figs. 1 and 3, form practically a single tapering pointed bar, which may be easily driven into a cork. The prongs may be separated by moving the handles toward each other to the position indicated in Fig. 2, which causes them when inserted into a cork to so engage therewith as that the implement cannot be withdrawn without also withdrawing the cork.

To increase the effectiveness of the implement, I roughen, serrate, or barb the outer edges of the prongs to form engaging-shoulders. In the drawings the serrated portions are shown as provided with upwardly-projecting teeth having beveled edges, so that, while they do not practically impede the ready insertion of the prongs into the cork, their shoulders, when the prongs are attempted to be withdrawn, engage with the cork and cause it to move with them.

The handles A A' may be operated entirely by grasping them in the hand; but I prefer to use a plate, B, perforated for the passage through it of the handles and sliding thereon to effect the opening and closing of the prongs or fingers $a$ $a'$. This plate is limited in its sliding movements upon the handles by stops C C' of any suitable character, pins being illustrated in the drawings.

When it is desired to insert the implement into a cork, the plate B is slid into the position shown in Fig. 1, which, separating the handles, causes the piercing-prongs to lie close side by side. If the plate be grasped while the prongs are being forced into the cork, it will insure their being held close together, while if the handles A A' were held there might be a tendency for them to approach each other, and hence separate the prongs, which would be objectionable. After the prongs have been forced through or sufficiently far into the cork, the operator pulls upon the plate in a direction away from the cork, which plate, sliding upon the handles, forces apart the prongs and then draws outward the cork. The separation of the prongs, and hence an increasing engagement thereof with the cork, will continue until the plate comes against the upper stop or stops, C', if the cork is not before extracted, after which the entire strength of the user will be used to withdraw the cork.

The slide or other separating device B may be dispensed with, or it may consist of two jointed toggle levers, D, breaking inward, as shown in dotted lines, Fig. 2, and the prongs may be plain or unserrated, or the shoulders may be formed by using prongs of a waved form, as shown in Fig. 6.

In Fig. 4 I have shown my invention combined with an operating-lever and stand in a manner useful where the extractor is in constant or frequent use, as in bar-rooms.

Referring to said figure, F represents a stand which may be movable or permanently fixed, that shown in the drawings having a foot-piece, $f$, perforated to receive set-screws, and in the upper end of which is pivoted an operating-lever, E, connected by a link, $e$, with the slide B of the extractor, or, when the toggle-levers D are employed, connected with them at their joint. It will be readily seen that by pressing down on the free end of the lever the prongs of the extractor will be closed together and forced into the cork of a bottle placed at I, when a reverse movement of the lever will cause the withdrawal of the cork, the bottle being held against moving upward in any desired manner, as by the plate G. This plate is arranged below the lever E and is held by a set-screw, H, to the standard, which is slotted, as at h, to permit the necessary adjustment required for bottles of different heights. The outer ends, G', of the plate may be made in the form of spring-fingers, so that while a bottle may be easily slipped between and drawn from them they will yet hold it with sufficient firmness to permit the cork to be withdrawn.

In Fig. 5 I have shown a convenient form of the invention for carrying in the pocket. In such form the handles are provided with finger-loops K, while one or both of them are jointed, as at k, to permit them to be folded down by the side of the prongs to lessen the danger of their cutting or piercing the person so carrying the implement.

Without limiting myself to the precise construction and arrangement of parts shown and described, I claim—

1. A cork-extractor having bars pivoted together and each provided with an operating-handle, and formed at their ends into piercing-prongs adapted to be brought together and driven into a cork, and to be separated within the cork by a movement of the handles, substantially as described.

2. A cork-extractor having bars pivoted together and each provided with an operating-handle, and formed at their ends into tapering piercing-prongs lying side by side and having shoulders, substantially as described.

3. A cork-extractor having pivoted bars, each provided with an operating-handle, and formed at their ends into piercing-prongs, in combination with a movable separating device between the handles, substantially as described.

4. A cork-extractor having pivoted bars, a sliding separating-plate, and stops to limit the movements of the plate supported upon the bars, substantially as described.

5. A cork-extractor having pivoted bars formed at their ends into piercing-prongs, in combination with a movable separating device, a lever pivoted to the separating device, and a support for the lever, substantially as set forth.

In testimony whereof I have signed my name to this specification in the presence of two subscribing witnesses.

JOHN W. MILAM.

Witnesses:
F. M. FREEMAN,
THOS. GREEN.